Aug. 16, 1966  W. A. ROBERTSON  3,266,347
SEAL INSTALLATION AND SETTING TOOL
Filed July 16, 1964
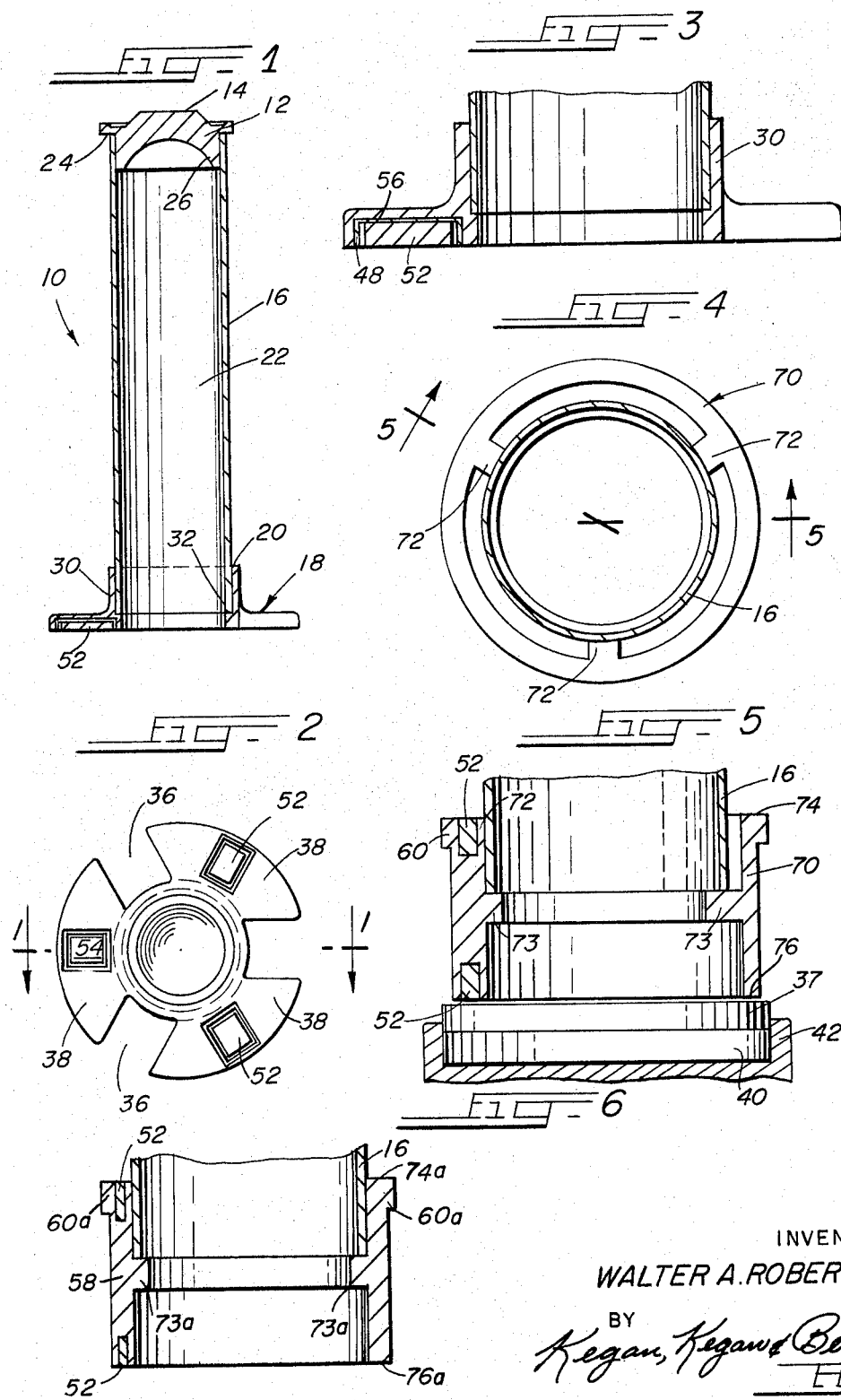
INVENTOR.
WALTER A. ROBERTSON
BY
Kegan, Kegan & Berkman
ATTYS

3,266,347
SEAL INSTALLATION AND SETTING TOOL
Walter A. Robertson, Grant Park, Ill., assignor to Allen Products, Inc., Grant Park, Ill., a corporation of Illinois
Filed July 16, 1964, Ser. No. 383,192
4 Claims. (Cl. 81—8.1)

This invention relates to an oil seal or grease seal installation tool for use in installing and driving a seal evenly, efficiently, and without damage to the sealing member. More specifically, the present invention is directed to a hand tool having removable seal holding or supporting means and adapted to have one end placed against the seal and to have the other end struck or tapped by an instrument such as a hammer to set the seal in the bore of a housing.

The substance of the instant invention is the incorporation in a seal installation and setting tool of magnet means adapted to hold a seal in place on a hand tool preparatory to and during the installation of the seal in place in a housing. In one preferred embodiment of the invention the plate on which the seal is supported during installation is provided with a slot or with slots through which the seal may be observed during the installation process.

It is a principal object of the present invention to provide an improved manually operated seal installation tool for use in the installation of seals in the bore of a housing, and utilizing improved seal holding means.

Another object of the invention is to provide a seal installation tool by means of which a sealing member may be installed in an efficient manner without damage to the seal.

Still another object of the invention is to provide a tool of the type indicated and which is provided with seal supporting means which are readily interchangeable for use with seals of varying sizes.

A related object of the invention is to provide a seal installation tool suitable for the installation of a seal in the presence of an outwardly projecting shaft or spline.

Another object of the invention is to provide a seal installation tool in which the seal element supported on the tool may be viewed throughout the installation process whereby proper alignment and placement are facilitated.

Another object of the invention is to provide an oil seal installation tool adapted for efficient use in the installation of seals of varying shaft diameter, and which is simply constructed for economy in manufacture.

Other and further objects and advantages of the invention not specifically set forth will become apparent from a reading of the following specification taken in conjunction with te drawings in which:

FIGURE 1 is an elevational view of the seal driver assembly of the invention illustrating the assembly in section for purposes of clarity and taken on the line 1—1 of FIGURE 2;

FIGURE 2 is an end view of the assembly of the invention;

FIGURE 3 is an enlarged vertical sectional view of the base of the tool of FIGURE 1 illustrating one form of the seal setting collar supported on the tubular handle of the tool;

FIGURE 4 is an end view of a second embodiment of the invention illustrating a modified form of the collar;

FIGURE 5 is a sectional view taken on the line 5—5 of FIGURE 4 and illustrating the seal setting collar of the tool with a seal supported thereon and showing the manner of use and the first stage of the seal installation operation; and FIGURE 6 is a cross sectional view of another embodiment of the seal setting collar of the tool of the invention.

Referring more particularly to the drawings, there is shown in FIGURES 1, 2, and 3, for the purpose of illustrative disclosure, a preferred embodiment of the seal installation tool or assembly of the invention. In the preferred embodiment depicted, the tool 10 includes a striker or driving head member 12 having a flat face 14 thereon, which is adapted to be struck or tapped on the surface thereof with a hammer mallet or the like, a position directing handle 16, and a combination pressure distributing or impact plate and magnetic seal holder 18. In the preferred embodiment of the invention depicted, the handle 16 is tubular in form and the seal supporting impact plate 18 is provided with a through longitudinal bore 20 which is co-axial with the tubular handle 16 and its passage 22 so that the tool may be employed in the positioning of a seal over a spline or a shaft (not shown).

For ease and simplicity of manufacture, the striker or driving head 12 is preferably a separate component positionable for sliding slip-on engagement with the end of the handle 16. As illustrated in FIGURE 1, the tubular handle 16 abuts a radial shoulder or flange 24 of the striker 12. In the particular embodiment of the tool depicted, the striker 12 is shown as having a stud portion 26 slidably received within the bore or passage 22 of the tubular handle 16. It is obvious that this particular arrangement may be reversed, if desired, to provide an equivalent structure in which the handle is received within a sleeve portion of the striker. It is also apparent that the striker may be integrally formed with the handle or may be joined thereto permanently by welding or the like.

The combination impact plate and seal holder 18 takes the form of a collar having an axially extending cylindrical wall 30 with an inwardly extending radial rib or flange 32 which serves as a handle abutment means when the handle 16 is slidably received into the collar. In a preferred embodiment of the invention, the impact plate is provided with one or more radial slots 36 which extend axially through the plate so that the seal 37 supported on the planar face 38 of the impact plate may be retained in view during positioning of the seal in the bore 40 of the housing 42 when the tool is used for its intended purposes.

The annular pressure distributing plate or collar 18 is provided on its forward planar face 38 with a plurality of spaced recesses 48 in each of which there is positioned a magnet 52 having an outer seal gripping planar surface 54 substantially flush with the face 38 of the impact plate 18. In a preferred arrangement, the magnet faces are displaced slightly inwardly of the face of the impact plate to prevent the application of mechanical striking forces to the magnet. Any preferred gripping or bonding means may be used to hold the magnets 52 within the recesses 48. In a preferred embodiment of the invention a somewhat elastomeric or resilient adhesive 56 or equivalent bonding agent is used as a buffer to reduce shock forces applied to the magnets. Preferred adhesive compositions are those which are resistant to oil and to oil removing solvents. The magnets themselves may be of any preferred formulation or composition and it has been found that barium ferrite magnets are particularly suitable. The precise cross sectional shape of the magnets is not critical, and although a given shape is illustrated in the drawing, other shapes are equally suitable.

An important feature of the seal installation tool of the invention is that the collar or impact plate 18 is essentially an adaptor and may be readily replaced and substituted by any number of adaptors having seal mounting portions of varying outside diameters, for use in installing seals of different shaft sizes. The proper adaptor may be readily selected and mounted on the handle 16 for use with a particular seal to effect a proper installation thereof in the bore of a housing.

It will be apparent that in practice an adaptor is selected such that its outer diameter is slightly less than the diameter of the bore 40 into which the seal is to be forced (FIGURE 5).

In effecting the installation of the seal 37, the proper size of collar or impact plate is positioned on the handle and striker assembly. As illustrated in FIGURES 5 and 6, each of the collars 70 and 58 may be provided at one end with an outwardly extending radial flange 60 and 60a at one end thereof so that a given collar may include planar impact faces 74 and 76, or 74a and 76a of two different outside diameters. The seal 37 is positioned on the face of the collar coaxially with the collar and is retained in position by the magnets 52. As the outer diameter of the seal 37 is slightly greater than the inner diameter of the bore 40, the seal must be forced into the bore. The seal 37, supported on the tool 10, is properly aligned with the bore 40, this operation being facilitated by means of the viewing slots 36 in the impact plate. Pressure is applied to the seal 37 through the tool either by manual efforts of the operator or through hammer blows against the striker 12, and the seal 37 is forced into the bore in pressed fit relation therewith and into abutment with a bearing or wall housing 42. A suitable shaft (not shown) may then be inserted to complete the assembling of the operative part associated with the housing 42. It is readily apparent that in the preferred structural embodiment of the seal installation tool, the tool may be used to position a seal or bearing over a spline or shaft.

Referring now to FIGURES 4 and 5, there is depicted a somewhat modified embodiment of the seal impact plate. As illustrated in the cross sectional representation in FIGURE 4, the collar 70 includes a plurality of annularly spaced radially extending ribs 72 which function as spacers or guides to ensure centering of the handle 16 within the collar 70. As seen more clearly in FIGURE 5, the end of the handle 16 abuts an annular flange 73. The collar 70 is reversible and, since the opposed ends have different external diameters, the collar is useful in the installation of seals of two different principal sizes. The opposed impact faces 74 and 76 of the collar 70 are each provided with magnets 52 held in recesses in the faces.

The embodiment of the collar depicted in FIGURE 6 is substantially the same as that illustrated in FIGURE 5 except that the ribs 72 have been eliminated and the internal diameter of the collar is such that it couples in sliding engagement with the tubular handle 16. As in the case of the embodiment depicted in FIGURE 5, the collar 58 of FIGURE 6 is provided with dual seal positioning surfaces 74a and 76a and an intermediate annular flange 73a.

The tool may be fabricated of any preferred suitable materials including metals and high impact plastics such as polyamides (nylon), polyesters (Lucite, Mylar), polyethylene and polypropylenes, etc. In a preferred embodiment of the assembly the tubular handle is steel and the impact plate and strikers are die cast zinc or aluminum alloys.

Although the invention has been described with respect to a preferred embodiment thereof, it is to be understood that it is not to be so limited, since changes can be made therein which are within the scope of the invention as defined by the appended claims.

What is claimed is:
1. A hand tool for use in driving a seal into the bore of a housing, said tool comprising:
   an impact plate having a plurality of recesses formed in an outer planar face thereof,
   magnetic seal-holding means disposed within said recesses and having magnetic coupling surfaces thereof substantially flush with said planar face of said impact plate,
   means retaining said magnetic seal-holding means fixed in said recesses,
   said impact plate having a handle receiving sleeve formed therein on a side of said plate opposing said outer planar face,
   an elongated handle adapted for insertion in said sleeve and having outside dimensions sized for frictional gripping engagement of said handle in said sleeve,
   said impact plate having a radially extending through slot through which a seal held in position on said planar face of said impact plate during positioning of said seal into said bore and driving of said seal into seating position may be observed from said side opposing said planar face.

2. The tool of claim 1 wherein said impact plate has a through axial opening and wherein said handle has an elongated axial bore communicating and coaxial with said opening in said plate,
   whereby in driving said seal said tool can be positioned over a shaft extending outwardly of and coaxial with the seal receiving bore of said housing.

3. A hand tool for use in the installation of seals in press fit relation in the bore of a housing, said tool comprising:
   a tubular handle of substantial axial length;
   a sleeve-like collar sized to couple telescopically with one end of said handle in sliding frictional engagement therewith,
   said collar having a radially extending annular flange displaced axially inwardly of an end of said collar,
   said flange constituting a mechanical stop for abutment against one end of said handle upon coupling of said handle with said collar;
   said collar comprising an annular pressure distributing plate to transfer pressure applied to said handle to a seal,
   said collar having spaced annularly disposed recesses in a planar pressure applying face thereof,
   seal holding means in said recesses comprising a plurality of magnets presenting planar magnet coupling faces substantially flush with said pressure applying face of said plate;
   and a striker head coaxial with said handle and connected to the other end thereof,
   said head having a rear radial face to receive blows to seat said seal in its operative position.

4. A hand tool for use in the installation of a seal into a bore of a housing, said tool comprising:
   a tubular handle and a seal-supporting collar carried on said handle at one end thereof,
   said collar comprising a hub extending coaxially with said handle and a face plate integral with said hub and extending transversely at an end thereof and annularly therearound,
   an annular flange extending radially inwardly of an inner wall surface of said hub and comprising an abutment stop for the end of said handle,
   a plurality of annularly spaced ribs extending radially inwardly of said inner wall surface of said hub between said flange and a handle receiving end of said hub and constituting centering and guide means for positioning of said handle within said hub, said face plate comprising a pressure distributing and seal supporting element and having a plurality of annularly spaced recesses extending into a planar pressure applying face thereof, magnets mounted in each of said recesses and having magnetic coupling surfaces thereof substantially flush with said face plate, said magnets constituting seal supporting means for holding said seal during positioning thereof preparatory to driving said seal into the bore of the housing.

References Cited by the Examiner

UNITED STATES PATENTS

| | | | |
|---|---|---|---|
| 1,393,605 | 10/1921 | Bergskaug | 81—8.1 |
| 2,586,087 | 2/1952 | Reynolds et al. | 29—275 X |
| 2,586,222 | 2/1952 | Hamilton. | |
| 2,860,535 | 11/1958 | Fowler | 81—8.1 |
| 2,908,908 | 10/1959 | Steinmetz et al. | 29—208 |
| 2,998,644 | 9/1961 | Thill | 81—8.1 |

WILLIAM FELDMAN, *Primary Examiner.*

MYRON C. KRUSE, *Examiner.*